(12) United States Patent
Akutsu et al.

(10) Patent No.: US 7,356,910 B2
(45) Date of Patent: Apr. 15, 2008

(54) METHOD OF MANUFACTURING A ROTATION ANGLE DETECTOR

(75) Inventors: Satoru Akutsu, Tokyo (JP); Tetsunao Takaki, Tokyo (JP); Hideki Megata, Tokyo (JP); Toshinori Tanaka, Tokyo (JP); Takeshi Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 482 days.

(21) Appl. No.: 11/088,748

(22) Filed: Mar. 25, 2005

(65) Prior Publication Data

US 2005/0168216 A1    Aug. 4, 2005

Related U.S. Application Data

(63) Continuation of application No. 10/320,628, filed on Dec. 17, 2002, now abandoned.

(30) Foreign Application Priority Data

Jan. 23, 2002    (JP)    ............... 2002-014182

(51) Int. Cl.
  *H01F 7/06*    (2006.01)
  *H01F 41/06*    (2006.01)
(52) U.S. Cl. .............. 29/605; 29/606; 29/602.1; 324/207.15; 324/207.25
(58) Field of Classification Search .............. 29/596, 29/605, 606, 602.1, 868; 324/207.15, 207.25, 324/207.22; 73/862.331, 862.328
See application file for complete search history.

(56) References Cited

U.S. PATENT DOCUMENTS

| | | | |
|---|---|---|---|
| 3,634,707 A | 1/1972 | Tillner et al. | |
| 4,346,253 A | 8/1982 | Saito et al. | |
| 5,345,670 A * | 9/1994 | Pitzele et al. | ............ 29/606 |
| 5,535,503 A | 7/1996 | Newman | |
| 5,760,505 A | 6/1998 | Farou et al. | |
| 6,031,307 A | 2/2000 | Ohshita | |

FOREIGN PATENT DOCUMENTS

| | | | | |
|---|---|---|---|---|
| EP | 0 917 273 A2 | 5/1999 | | |
| JP | 61139243 A | 6/1986 | | |
| JP | 1-122347 | * 5/1989 | ............ 29/596 |
| JP | 7-240006 | 9/1995 | | |
| JP | 10-12427 | 1/1998 | | |
| JP | 10-322998 | 12/1998 | | |
| JP | 2000-354347 | 12/2000 | | |
| JP | 2001-136703 | 5/2001 | | |
| JP | 2001-141515 A | 5/2001 | | |
| JP | 2001-145291 | 5/2001 | | |
| JP | 2001-169493 | 6/2001 | | |
| JP | 2001-330472 | 11/2001 | | |

* cited by examiner

*Primary Examiner*—A. Dexter Tugbang
(74) *Attorney, Agent, or Firm*—Sughrue Mion, PLLC

(57) ABSTRACT

A method for manufacturing a rotation angle detector is provided. An insulator is mounted on a sensor core. A plurality of winding slackening pins are disposed at predetermined positions between a plurality of teeth and a plurality of terminal pins so as to project out of the a first surface side of the insulator. A first and second conductor wire are wound so as to dispose a first and second lead wire portion of each conductor wire wound on the teeth under tension between the teeth and the terminal pin by hooking each wire lead portion onto a winding hooking pin and a winding slackening pin. The winding slackening pins are removed so that the first and second lead wire portions have a predetermined amount of slack.

4 Claims, 12 Drawing Sheets

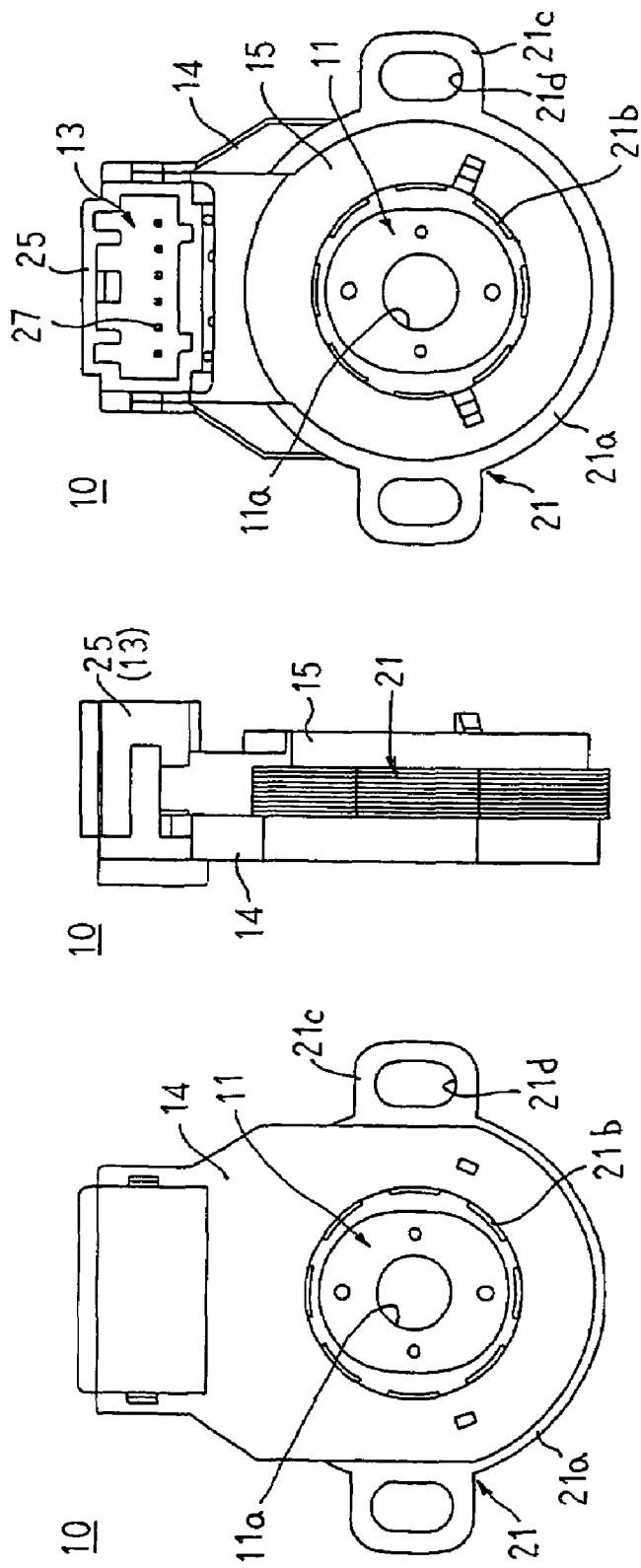

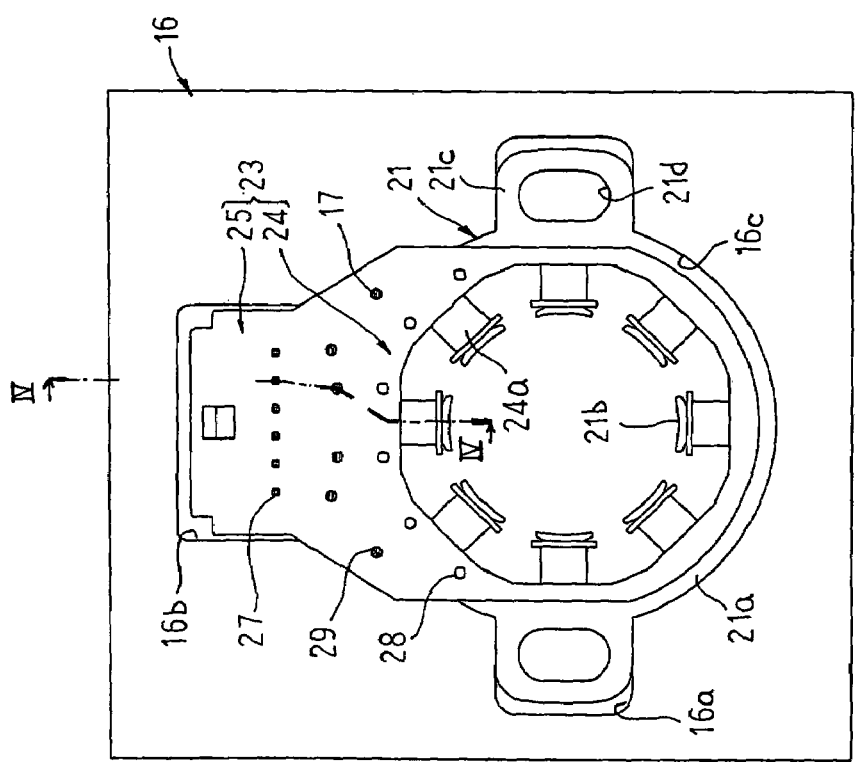

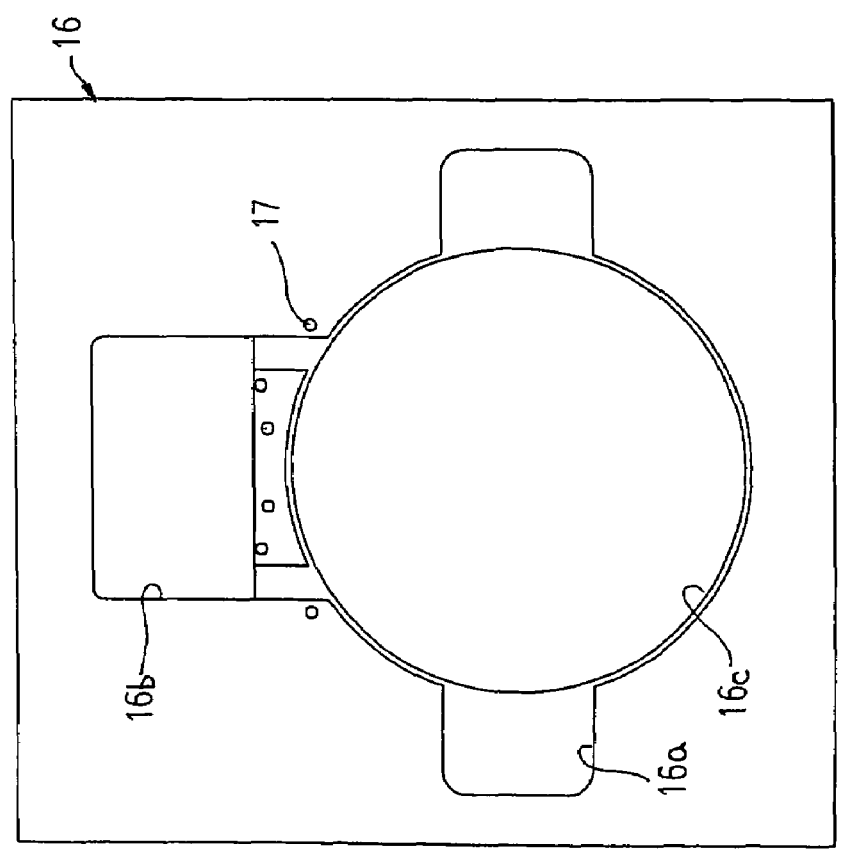
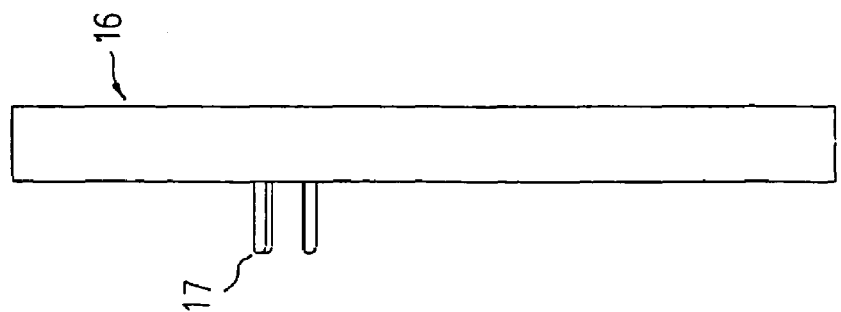
FIG. 5 (A)  FIG. 5 (B)

F I G. 1 3
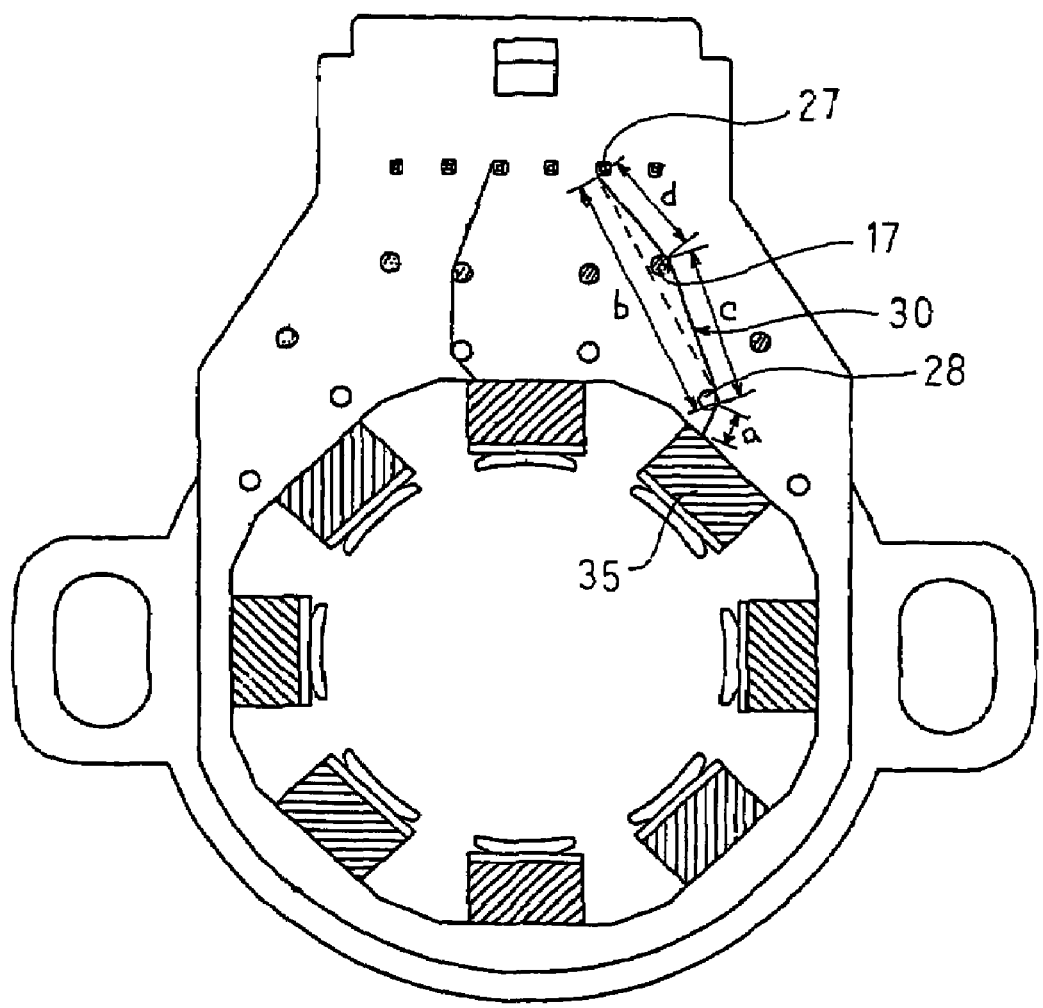

METHOD OF MANUFACTURING A ROTATION ANGLE DETECTOR

This is a Continuation of application Ser. No. 10/320,628 filed Dec. 17, 2002 now abandoned, the disclosure of which is incorporated herein.

BACKGROUND OF THE INVENTION

1. Field of the Invention

The present invention relates to a rotation angle detector for detecting a rotational position of a rotor in a dynamoelectric machine such as an alternator, an electric motor, a generator-motor, etc.

2. Description of the Related Art

FIG. 14 is a perspective showing a sensor stator of a conventional rotation angle detector such as described in Japanese Patent Laid-Open No. 2001-136703, for example.

In FIG. 14, a sensor core 2 is prepared by laminating a magnetic steel sheet, for example, projecting portions 2a and slots 2b being alternately formed on an inner circumferential portion of an annular yoke. An insulator 3 is prepared in an annular shape using an electrically-insulating resin, having projecting portions 3a corresponding to each of the protruding portions 2a and slot portions 3b corresponding to each of the slots 2b, being disposed so as to hold the sensor core 2 from opposite sides. Thus, each of the protruding portions 2a and each of the slots 2b are surrounded by the projecting portions 3a and the slot portions 3b so as to be held in an electrically-insulated state. Crossover wire guide portions 3c are disposed so as to stand on the insulator 3 at an outer circumferential end of each of the slots portion 3b. In addition, a connector 4 is formed integrally on an outer circumferential portion of the insulator 3. A plurality of terminal pins 5 are disposed in this connector 4, lead wires 6 being connected to each of the terminal pins 5.

Although not shown, a sensor stator 1 is constructed by winding a winding onto a terminal pin 5 corresponding to a winding start thereof, then winding the winding onto the projecting portions 3a surrounding the protruding portions 2a so as to be guided by the crossover wire guide portions 3c, winding the winding onto a terminal pin 5 corresponding to a winding finish thereof, and then soldering first and second end portions (the winding start and the winding finish) of the winding onto the terminal pins 5.

When a conventional rotation angle detector constructed in this manner is mounted to an actual machine, the temperature in the environment around the rotation angle detector varies. As a result, dimensional changes arise due to expansion and contraction of the insulator 3 and the connector 4, being resin-molded parts. Thus, in this sensor stator 1, because the first and second end portions of the winding are disposed between the crossover wire guide portions 3c and the terminal pins 5 in a state of tension, there has been a risk that tensile stress resulting from the dimensional changes of the insulator 3 and the connector 4 will act on the first and second end portions of the winding and give rise to wire breakages.

Furthermore, in this sensor stator 1, because the connector 4 is disposed on an outer circumferential portion of the insulator 3, the distance between the wound portion of the winding wound onto the projecting portions 3a and the terminal pins 5 is large. Thus, the danger of the first or second end portions of the winding breaking due the tensile stress resulting from the temperature changes described above has been great.

In order to solve problems of this kind, improvements have been proposed which try to suppress the occurrence of wire breakages by shortening the distance between the wound portion of the winding and the terminal pins to reduce the tensile stress resulting from the dimensional changes in the resin-molded parts accompanying temperature changes.

In a sensor stator 1A of a first conventional rotation angle detector proposed as an improvement, an insulator 3A and a connector 4A are prepared separately using an electrically-insulating resin, a plurality of relay terminals 7 are disposed so as to stand in a vicinity of an outer circumference of the projecting portions 3a of the insulator 3A, a plurality of terminal pins 5 are disposed on the connector 4A, and the connector 4A is integrated with the insulator 3A by means of a relay circuit board 8 so as to be positioned on an outer circumferential side of the insulator 3A, as shown in FIG. 15. The corresponding relay terminals 7 and terminal pins 5 are electrically connected by means of a conductor pattern 8a on the relay circuit board 8. Furthermore, a winding 9 is wound onto a relay terminal 7 corresponding to a winding start thereof, then wound onto the projecting portions 3a surrounding the protruding portions 2a, wound onto a relay terminal 7 corresponding to a winding finish thereof, and then the first and second end portions of the winding 9 are soldered onto the respective relay terminals 7.

In a sensor stator 1B of a second conventional rotation angle detector proposed as an improvement, a connector 4B is formed integrally with the insulator 3B using an electrically-insulating resin so as to be positioned on an outer circumferential side of the insulator 3B, and a plurality of terminal pins 5A are insert molded into the insulator 3B and the connector 4B, as shown in FIG. 16. A first end of each of the terminal pins 5A is disposed so as to stand in the vicinity of an outer circumference of the projecting portions 3a, and a second end is formed into a shape projecting inside the connector 4B. Furthermore, a winding 9 is wound onto a terminal pin 5A corresponding to a winding start thereof, then wound onto the projecting portions 3a surrounding the protruding portions 2a, wound onto a terminal pin 5A corresponding to a winding finish thereof, and then the first and second end portions of the winding 9 are soldered onto the respective terminal pins 5A.

In the sensor stators 1A and 1B for a conventional rotation angle detector proposed as improvements constructed in this manner, because the first ends of the relay terminals 7 or the terminal pins 5A are positioned in the vicinity of the outer circumference of the projecting portions 3a, the distance between the wound portion of the winding 9 wound onto the projecting portions 3a and the first ends of the relay terminals 7 or the terminal pins 5 is shortened. Thus, tensile stress resulting from temperature changes acting on the first and second end portions of the winding 9 is reduced, suppressing the occurrence of wire breakages in the first and second end portions of the winding 9.

However, in the first sensor stator 1A, relay terminals 7 and a relay circuit board 8 are required, increasing the number of parts and making the construction of the sensor stator complicated, and one problem has been that the first sensor stator 1A is expensive as far as cost is concerned.

In the second sensor stator 1B, because terminal pins 5A having a complicated shape are insert molding into the insulator 3B (and the connector 4B), one problem has been that the second sensor stator 1B is also expensive as far as cost is concerned.

In addition, in the first and second sensor stators 1A and 1B, the distance between the wound portion of the winding 9 wound into the projecting portions 3a and the first ends of the relay terminals 7 or the terminal pins 5 is shortened, but because the first and second end portions of the winding 9 are disposed in a state of tension between the wound portion of the winding 9 wound onto the projecting portions 3a and the relay terminals 7 or the terminal pins 5, tensile stress resulting from temperature changes acts on the first and second end portions of the winding 9 without being alleviated. Thus, these constructions do not enable the danger of the occurrence of wire breakages to be avoided completely.

SUMMARY OF THE INVENTION

The present invention aims to solve the above problems and an object of the present invention is to provide an inexpensive rotation angle detector enabling the occurrence of wire breakages in a winding in a sensor stator to be reliably suppressed by providing a predetermined amount of slack in first and second end portions of the winding positioned between a wound portion of the winding and terminal pins to alleviate tensile stress resulting from temperature changes.

With the above object in view, the rotation angle detector includes a sensor core in which a plurality of teeth are formed on an inner circumferential portion of an annular yoke, a sensor coil composed of an excitation winding and an output winding each constructed by installing a conductor wire on the teeth, an insulator mounted to the sensor core so as to electrically insulate the sensor core and the sensor coil, a connector formed integrally with the insulator so as to be positioned on an outer circumferential side of the yoke; and a sensor rotor rotatably disposed inside the yoke. Lead wire portions of the conductor wires constituting the excitation winding and the output winding are each joined to a terminal pin of the connector on a first surface side of the insulator so as to have a predetermined amount of slack.

Whereby tensile force acting on the lead wire portions of the conductor wires as a result of changes in temperature in the working environment is absorbed by the slack in the lead wire portions, preventing wire breakages due to changes in the temperature in the working environment even if the lead wire portions are connected directly to the terminal pins. Thus, the inexpensive rotation angle detector is provided enabling the need for connecting parts such as relay circuit boards, etc., to be eliminated and the occurrence of wire breakages in the windings to be reliably suppressed.

BRIEF DESCRIPTION OF THE DRAWINGS

FIG. 1A is a front elevation explaining a construction of a rotation angle detector according to Embodiment 1 of the present invention;

FIG. 1B is a side elevation explaining the construction of the rotation angle detector according to Embodiment 1 of the present invention;

FIG. 1C is a rear elevation explaining the construction of the rotation angle detector according to Embodiment 1 of the present invention;

FIG. 3A is a front elevation explaining a winding-jig-mounted state of the sensor stator of the rotation angle detector according to Embodiment 1 of the present invention;

FIG. 3B is a side elevation explaining the winding-jig-mounted state of the sensor stator of the rotation angle detector according to Embodiment 1 of the present invention;

FIG. 5A is a front elevation explaining a winding jig used in a method for manufacturing the sensor stator of the rotation angle detector according to Embodiment 1 of the present invention;

FIG. 5B is a side elevation explaining the winding jig used in the method for manufacturing the sensor stator of the rotation angle detector according to Embodiment 1 of the present invention;

FIG. 13 is a diagram explaining slack in lead wire portions of conductor wires in the rotation angle detector according to Embodiment 1 of the present invention;

DETAILED DESCRIPTION OF THE PREFERRED EMBODIMENT

A preferred embodiment of the present invention will now be explained with reference to the drawings.

EMBODIMENT 1

Figures 2A, 2B, 2C:
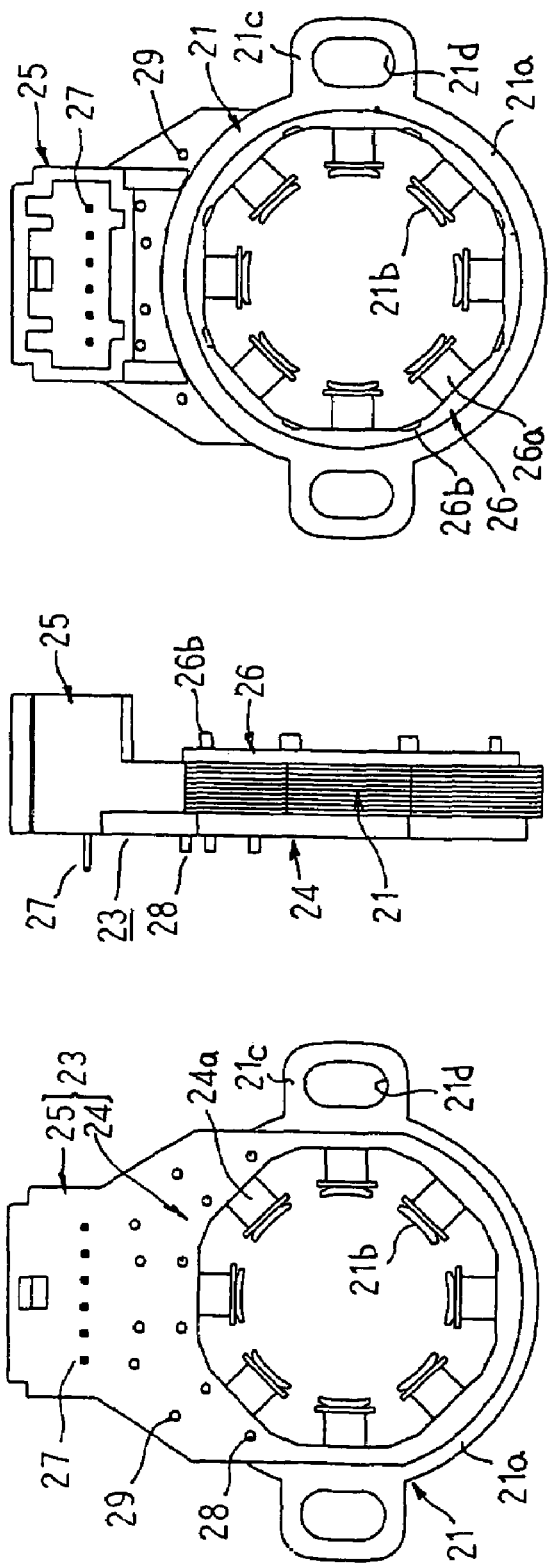
FIG. 2A is a front elevation explaining a mounted state of an insulator of a sensor stator of the rotation angle detector according to Embodiment 1 of the present invention.
FIG. 2B is a side elevation explaining the mounted state of the insulator of the sensor stator of the rotation angle detector according to Embodiment 1 of the present invention.
FIG. 2C is a rear elevation explaining the mounted state of the insulator of the sensor stator of the rotation angle detector according to Embodiment 1 of the present invention.
Figure 4:
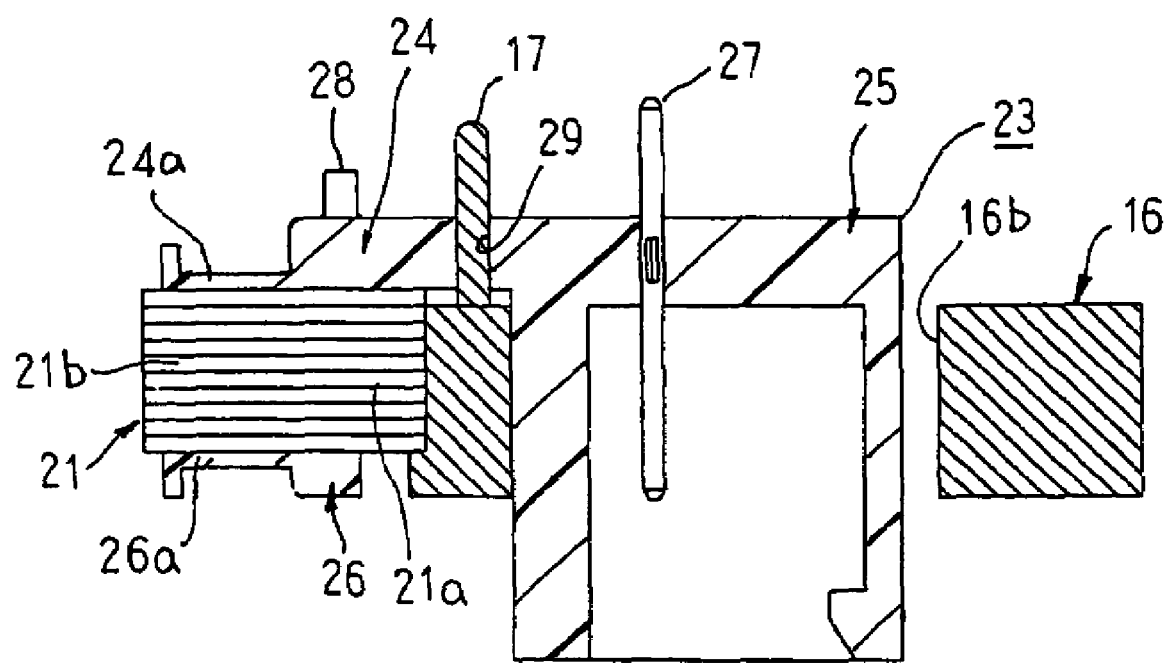
FIG. 4 is a cross section taken along line IV-IV in FIG. 3A viewed from the direction of the arrows.
Figure 6:
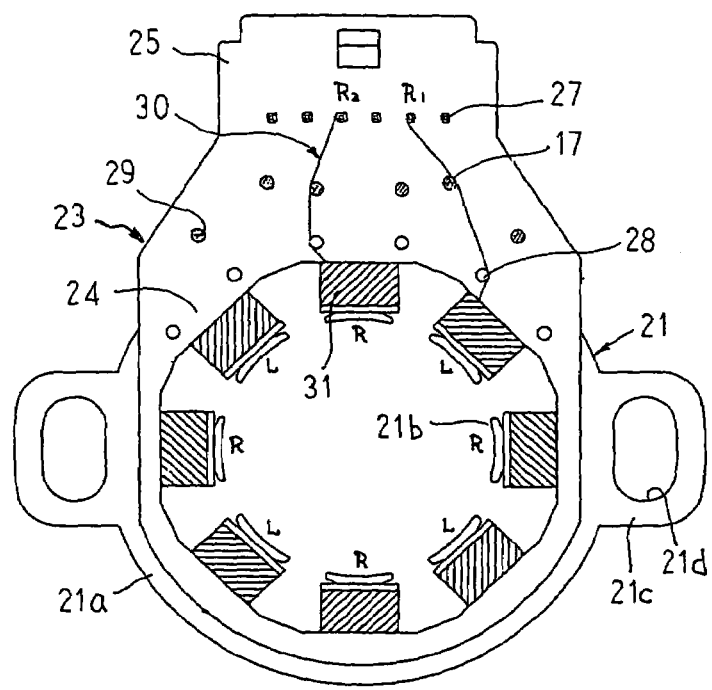
FIG. 6 is a front elevation showing an installed state of an excitation winding of the sensor stator of the rotation angle detector according to Embodiment 1 of the present invention.
Figure 7:
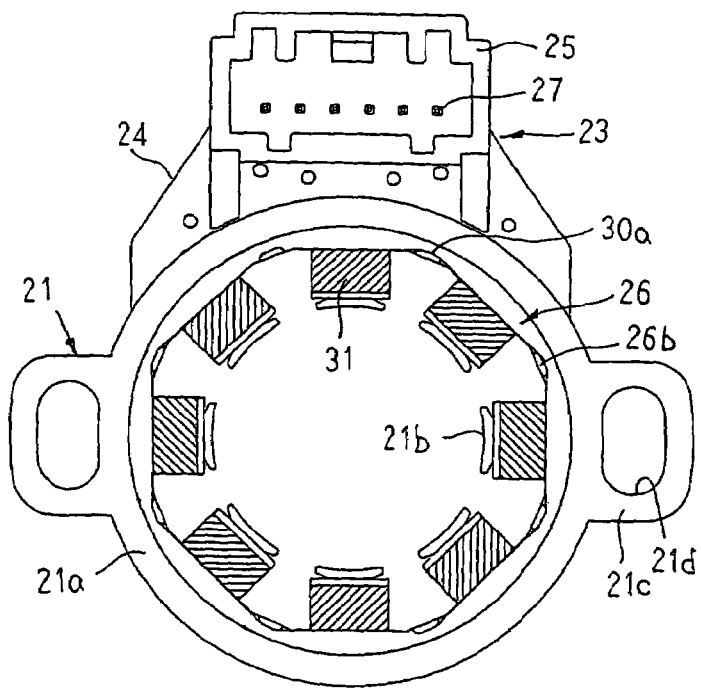
FIG. 7 is a rear elevation showing the installed state of the excitation winding of the sensor stator of the rotation angle detector according to Embodiment 1 of the present invention.
Figure 8:
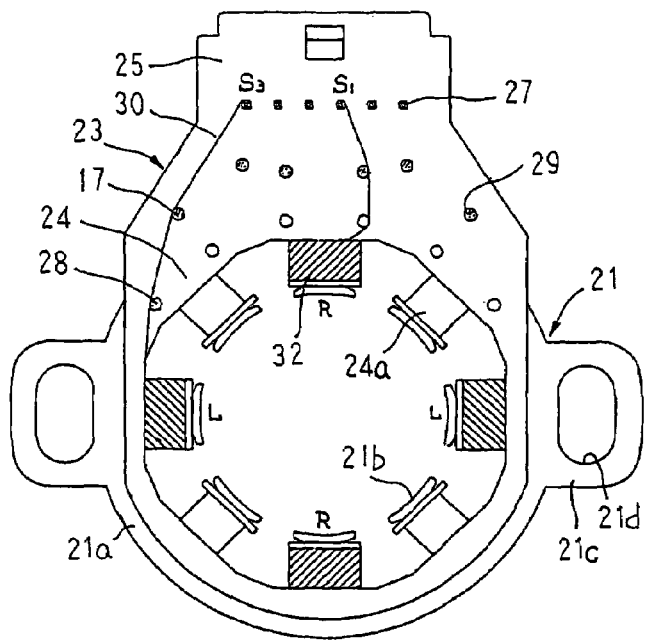
FIG. 8 is a front elevation showing an installed state of a first output winding of the sensor stator of the rotation angle detector according to Embodiment 1 of the present invention.
Figure 9:
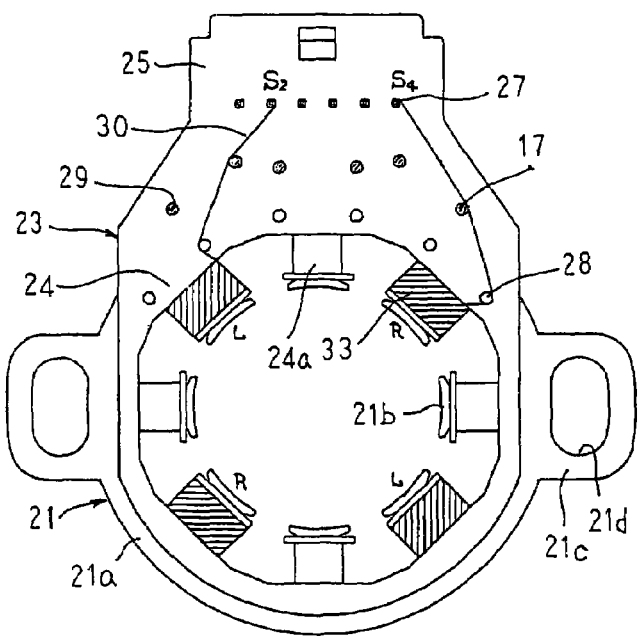
FIG. 9 is a front elevation showing an installed state of a second output winding of the sensor stator of the rotation angle detector according to Embodiment 1 of the present invention.
Figure 10:
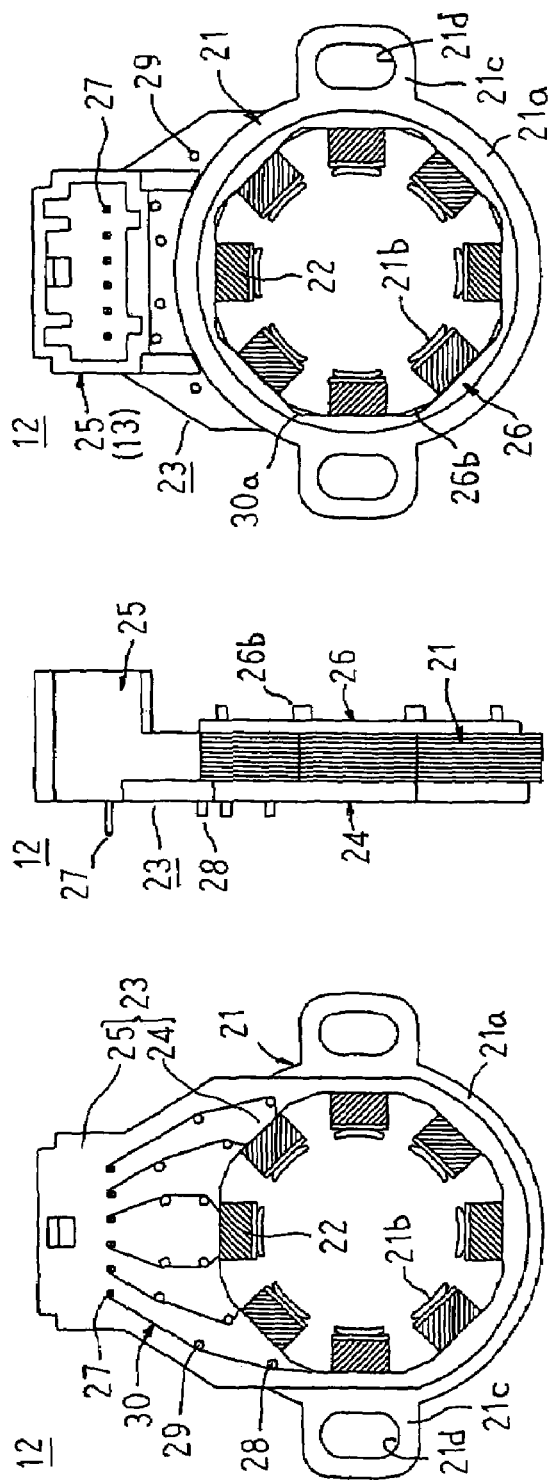
FIG. 10A is a front elevation explaining an installed state of the windings of the sensor stator of the rotation angle detector according to Embodiment 1 of the present invention.
FIG. 10B is a side elevation explaining the installed state of the windings of the sensor stator of the rotation angle detector according to Embodiment 1 of the present invention.
FIG. 10C is a rear elevation explaining the installed state of the windings of the sensor stator of the rotation angle detector according to Embodiment 1 of the present invention.
Figure 11:
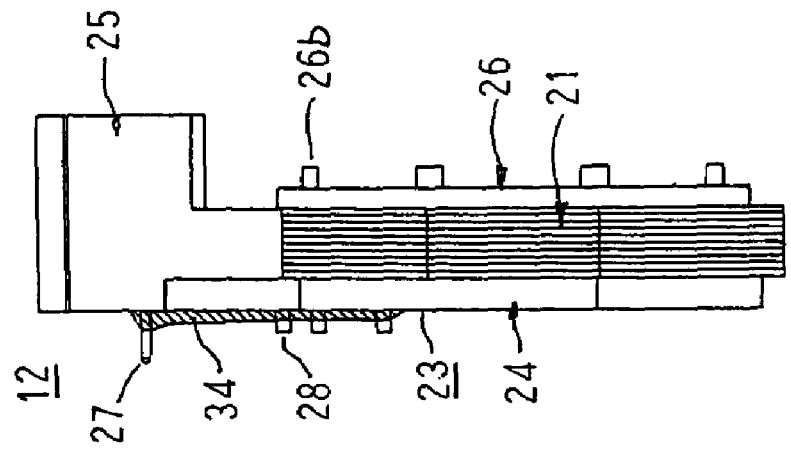
FIG. 11A is a front elevation explaining an applied state of a silicone rubber in the sensor stator of the rotation angle detector according to Embodiment 1 of the present invention.
FIG. 11B is a side elevation explaining the applied state of the silicone rubber in the sensor stator of the rotation angle detector according to Embodiment 1 of the present invention.
Figure 11:
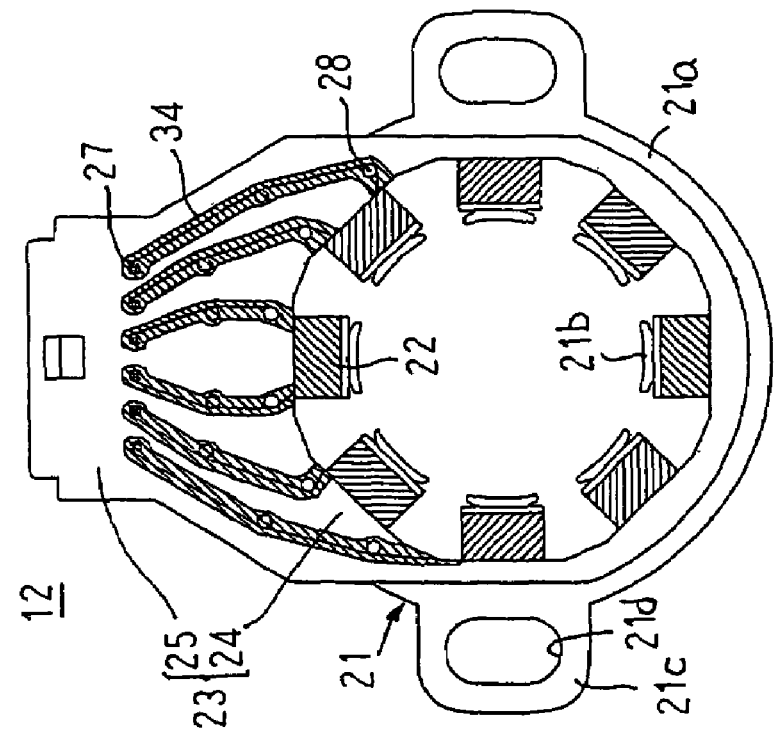
Figure 12:
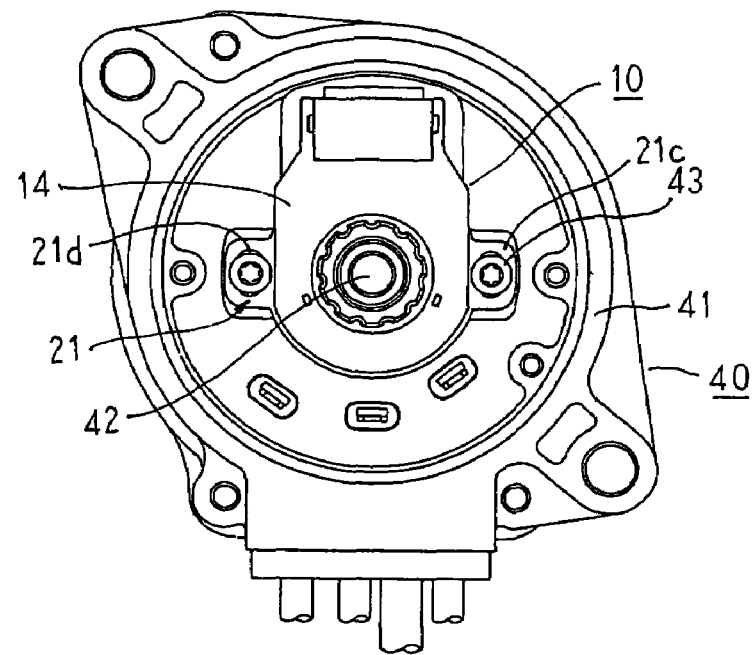
FIG. 12A is a front elevation explaining a state of the sensor stator of the rotation angle detector according to Embodiment 1 of the present invention mounted to a motor.
FIG. 12B is a cross section explaining the state of the sensor stator of the rotation angle detector according to Embodiment 1 of the present invention mounted to the motor.
Figure 12:
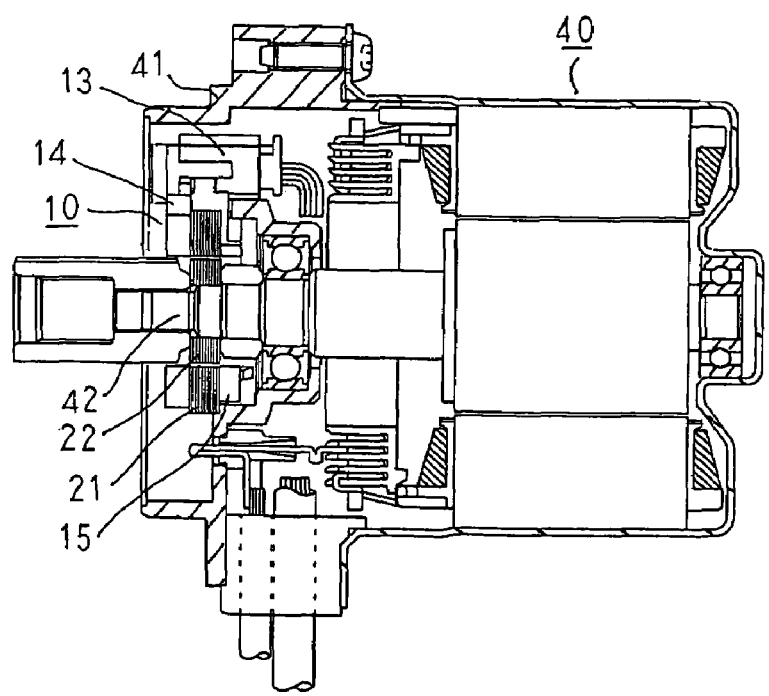
Figure 14:
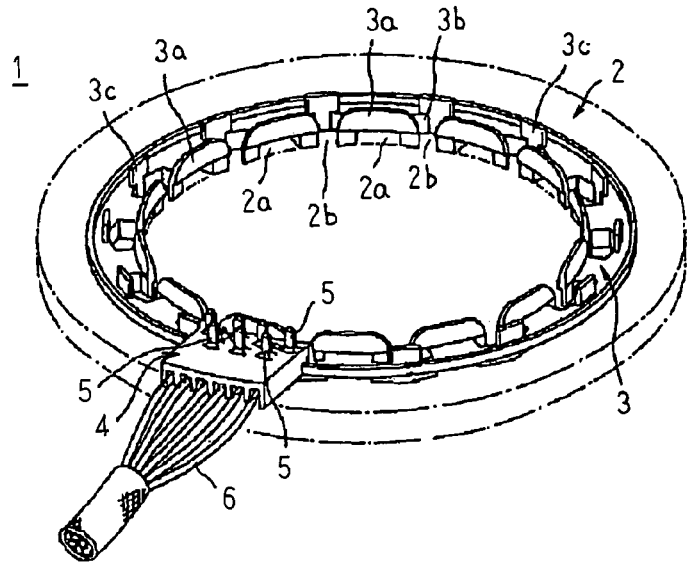
FIG. 14 is a perspective showing a sensor stator of a conventional rotation angle detector.
Figure 15:
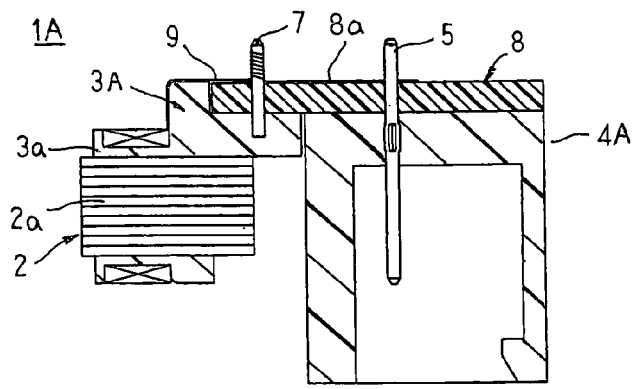
FIG. 15 is a partial cross section showing a first sensor stator proposed as an improvement for the conventional rotation angle detector.
Figure 16:
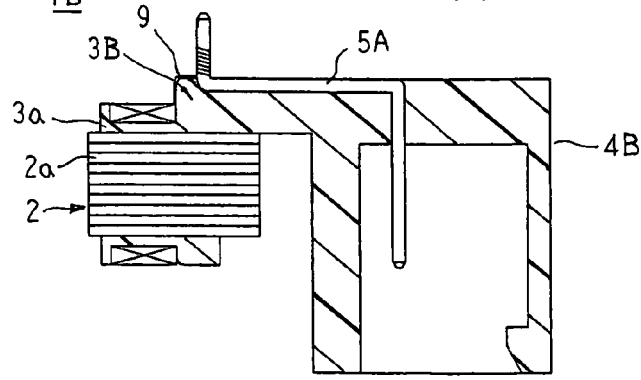
FIG. 16 is a partial cross section showing a second sensor stator proposed as an improvement for the conventional rotation angle detector.

FIG. 1A is a front elevation, FIG. 1B is a side elevation, and FIG. 1C is a rear elevation, each explaining a construction of a rotation angle detector according to Embodiment 1 of the present invention. FIG. 2A is a front elevation, FIG. 2B is a side elevation, and FIG. 2C is a rear elevation, each explaining a mounted state of an insulator of a sensor stator of the rotation angle detector according to Embodiment 1 of the present invention. FIG. 3A is a front elevation and FIG. 3B is a side elevation, each explaining a winding-jig-mounted state of the sensor stator of the rotation angle detector according to Embodiment 1 of the present invention. FIG. 4 is a cross section taken along line IV-IV in FIG. 3A viewed from the direction of the arrows. FIG. 5A is a front elevation and FIG. 5B is a side elevation, each explaining a winding jig used in a method for manufacturing the sensor stator of the rotation angle detector according to Embodiment 1 of the present invention. FIG. 6 is a front elevation showing an installed state of an excitation winding of the sensor stator of the rotation angle detector according to Embodiment 1 of the present invention, FIG. 7 is a rear elevation showing the installed state of the excitation winding of the sensor stator of the rotation angle detector according to Embodiment 1 of the present invention, FIG. 8 is a front elevation showing an installed state of a first output winding of the sensor stator of the rotation angle detector according to Embodiment 1 of the present invention, and FIG. 9 is a front elevation showing an installed state of a second output winding of the sensor stator of the rotation angle detector according to Embodiment 1 of the present invention. FIG. 10A is a front elevation, FIG. 10B is a side elevation, and FIG. 10C is a rear elevation, each explaining an installed state of the windings of the sensor stator of the rotation angle detector according to Embodiment 1 of the present invention. FIG. 11A is a front elevation and FIG. 11B is a side elevation, each explaining an applied state of a silicone rubber in the sensor stator of the rotation angle detector according to Embodiment 1 of the present invention. FIG. 12A is a front elevation and FIG. 12B is a cross section, each explaining a state of the sensor stator of the rotation angle detector according to Embodiment 1 of the present invention mounted to a motor.

In the figures, a rotation angle detector 10 is provided with: a sensor rotor 11; a sensor stator 12; an input-output connector 13; an upper protective cover 14; and a lower protective cover 15.

The sensor rotor 11 is constructed by laminating and integrating a predetermined number of sheets of a magnetic material such as a silicon steel sheet, for example, formed by punching into a predetermined shape. An interfitting aperture 11a is disposed through a center of this sensor rotor 11. The external shape of the sensor rotor 11 is formed into a curve such that gap permeance between the sensor rotor 11 and a sensor core 21 described below changes sinusoidally with angle.

The sensor stator 12 includes: a sensor core 21; a sensor coil 22; an upper insulator 23; a lower insulator 26, etc.

The sensor core 21 is constructed by laminating and integrating a predetermined number of sheets of a magnetic material such as a silicon steel sheet, for example, formed by punching into a predetermined shape. In this sensor core 21, eight (first to eighth) teeth 21b projecting radially inward are formed on an inner circumferential portion of an annular yoke 21a at an even angular pitch in a circumferential direction, and a pair of flange portions 21c for mounting are disposed so as to extend radially outward from outer circumferential portions. Furthermore, elongated mounting apertures 21d are disposed through each of the flange portions 21c.

The upper insulator 23 is formed integrally with an annular portion 24 having an annular shape for covering the sensor core 21 and a connector portion 25 using an electrically-insulating resin such as a polybutylene terephthalate (PBT) resin, for example, such that the connector portion 25 is positioned on an outer circumferential side of the annular portion 24. Electrically-insulating segments 24a having a bracket-shaped cross section for covering upper surfaces and first and second side surfaces of the teeth 21b are formed on an inner circumferential side of this annular portion 24 so as to correspond to each of the teeth 21b of the sensor core 21. Furthermore, six (first to sixth) terminal pins 27 formed by press-forming a copper alloy wire material are mounted by press-fitting to the upper insulator 23 such that a first end of each projects from an upper surface by a predetermined length, and a second end of each projects inside the connector portion 25 by a predetermined length. Moreover, the second ends of the terminal pins 27 project inside the connector portion 25 to constitute the connector 13. In addition, six (first to sixth) winding hooking pins 28 are formed integrally on an outer circumferential side of the annular portion 24 nearest to where the connector portion 25 is installed so as to project from the upper surface by a predetermined length. Still furthermore, six (first to sixth) winding slackening pin insertion apertures 29 are disposed through the upper insulator 23 so as to each be positioned between a terminal pin 27 and the winding hooking pin 28 corresponding to that terminal pin 27.

The lower insulator 26 is formed into an annular shape using an electrically-insulating resin such as a PBT resin, for example, electrically-insulating segments 26a having a bracket-shaped cross section for covering lower surfaces and first and second side surfaces of the teeth 21b being formed on an inner circumferential side thereof so as to correspond to each of the teeth 21b of the sensor core 21, and first to eighth crossover wire guide portions 26b being disposed so as to stand between the electrically-insulating segments 26a. The upper insulator 23 and the lower insulator 26 are disposed so as to hold the sensor core 21 from above and below. Thus, each of the teeth 21b are surrounded by the electrically-insulating segments 24a and 26a and electrically insulated from the sensor coil 22.

The sensor coil 22 is constituted by: an excitation winding 31 formed by winding a first conductor wire 30 composed of a copper wire coated with an electrical insulator onto all of the teeth 21b; and first and second output windings 32 and 33 formed by winding second and third conductor wires 30, respectively, onto alternate teeth 21b. The winding starts and the winding finishes of the excitation winding 31 and the first and second output windings 32 and 33 are each hooked onto one of the winding hooking pins 28 and then connected to one of the terminal pins 27 so as to have a predetermined amount of slack. Moreover, the conductor wires 30 are wound onto the electrically-insulating segments 24a and 26a surrounding the teeth 21b for a predetermined number of winds.

Then, a silicone rubber 34 functioning as a lead wire protective resin layer is applied so as to embed winding start ends and winding finish ends (lead wire portions) of the excitation winding 31 and the first and second output windings 32 and 33.

The upper protective cover 14 and the lower protective cover 15 are formed using an electrically-insulating resin such as a PBT resin, for example, into shapes enveloping the upper insulator 23 and the lower insulator 26 so as to leave tip portions of the teeth 21b of the sensor core 21 exposed. The upper protective cover 14 and the lower protective cover 15 are placed on the sensor core 21 from above and below, respectively. Here, upper and lower surfaces of the sensor core 21 are covered by the upper protective cover 14 and the lower protective cover 15, and the teeth 21b are covered by the electrically-insulating segments 24a and 26a except for the tip portions.

Moreover, as shown in FIGS. 5A and 5B, recess portions 16a for housing the flange portions 21c of the sensor core 21, a first penetrating aperture 16b for housing the connector portion 25, and a second penetrating aperture 16c for housing the lower insulator 26 are formed in a winding jig 16 used in the operation of winding the sensor coil 22, and in addition, six (first to sixth) winding slackening pins 17 are disposed so as to stand at predetermined positions.

Next, a method for assembling the rotation angle detector 10 constructed in this manner will be explained.

First, the upper insulator 23 and the lower insulator 26 are disposed so as to hold the sensor core 21 from above and below. Thus, as shown in FIGS. 2A, 2B, and 2C, each of the teeth 21b are surrounded by the electrically-insulating segments 24a and 26a.

Next, as shown in FIGS. 3A, 3B, and 4, the sensor core 21 on which the upper insulator 23 and the lower insulator 26 are disposed is set in the winding jig 16. Here, the sensor core 21 is positioned relative to the winding jig 16 by housing the flange portions 21c inside the recess portions 16a. The connector portion 25 is housed inside the first penetrating aperture 16b, and the lower insulator 26 is housed inside the second penetrating aperture 16c. In addition, the first to sixth winding slackening pins 17 are passed through the first to sixth winding slackening pin insertion apertures 29, respectively, and project from the upper surface of the upper insulator 23.

Thus, as shown in FIG. 6, the winding start of the first conductor wire 30 is wound onto the second terminal pin 27 ($R_1$), the first conductor wire 30 is then hooked onto the second winding slackening pin 17, is also hooked onto the second winding hooking pin 28, and is then wound into a left-handed winding for a predetermined number of winds on the electrically-insulating segments 24a and 26a surrounding the first tooth 21b. Then, as shown in FIG. 7, a crossover wire portion 30a of the first conductor wire 30 is hooked onto the first crossover wire guide portion 26b on the lower insulator 26, and then the first conductor wire 30 is wound into a right-handed winding for a predetermined number of winds on the electrically-insulating segments 24a and 26a surrounding the second tooth 21b. This procedure is performed repeatedly such that the first conductor wire 30 is alternately wound into left-handed and right-handed windings on the electrically-insulating segments 24a and 26a surrounding each of the teeth 21b. Then, after winding the first conductor wire 30 onto the electrically-insulating segments 24a and 26a surrounding the last (eighth) tooth 21b, the first conductor wire 30 is hooked onto the fourth winding hooking pin 28, then hooked onto the fourth winding slackening pin 17, and then wound onto the fourth terminal pin 27 ($R_2$). The first and second ends of the first conductor wire 30 (the winding start and the winding finish) are soldered to the second and fourth terminal pins 27 ($R_1$ and $R_2$) to obtain the excitation winding 31. Here, the winding start end (a lead wire portion) of the first conductor wire 30 is disposed under tension between the second terminal pin 27 ($R_1$) and the first tooth 21b, and the winding finish end (a lead wire portion) of the first conductor wire 30 is disposed under tension between the fourth terminal pin 27 ($R_2$) and the eighth tooth 21b.

Moreover, an L in FIG. 6 indicates a left-handed winding, and an R a right-handed winding.

Next, as shown in FIG. 8, the winding start of the second conductor wire 30 is wound onto the third terminal pin 27 ($S_1$), the second conductor wire 30 is then hooked onto the third winding slackening pin 17, is also hooked onto the third winding hooking pin 28, and is then wound into a right-handed winding for a predetermined number of winds on the electrically-insulating segments 24a and 26a surrounding the eighth tooth 21b. Then, a crossover wire portion 30a of the second conductor wire 30 is hooked onto the eighth and first crossover wire guide portions 26b on the lower insulator 26, and then the second conductor wire 30 is wound into a left-handed winding for a predetermined number of winds on the electrically-insulating segments 24a and 26a surrounding the next tooth 21b but one (the second tooth 21b). This procedure is performed repeatedly such that the second conductor wire 30 is alternately wound into right-handed and left-handed windings on the electrically-insulating segments 24a and 26a surrounding every second tooth 21b (the eighth, second, fourth, and sixth teeth 21b). Then, after winding the second conductor wire 30 onto the electrically-insulating segments 24a and 26a surrounding the last (sixth) tooth 21b, the second conductor wire 30 is hooked onto the sixth winding hooking pin 28, then hooked onto the sixth winding slackening pin 17, and then wound onto the sixth terminal pin 27 ($S_3$). The first and second ends of the second conductor wire 30 (the winding start and the winding finish) are soldered to the third and sixth terminal pins 27 ($S_1$ and $S_3$) to obtain the first output winding 32. Here, the winding start end (a lead wire portion) of the second conductor wire 30 is disposed under tension between the third terminal pin 27 ($S_1$) and the eighth tooth 21b, and the winding finish end (a lead wire portion) of the second conductor wire 30 is disposed under tension between the sixth terminal pin 27 ($S_3$) and the sixth tooth 21b.

Moreover, an L in FIG. 8 indicates a left-handed winding, and an R a right-handed winding. Furthermore, the excitation winding 31 has been omitted from FIG. 8 to facilitate explanation.

Next, as shown in FIG. 9, the winding start of the third conductor wire 30 is wound onto the first terminal pin 27 ($S_4$), the third conductor wire 30 is then hooked onto the first winding slackening pin 17, is also hooked onto the first winding hooking pin 28, and is then wound into a right-handed winding for a predetermined number of winds on the electrically-insulating segments 24a and 26a surrounding the first tooth 21b. Then, a crossover wire portion 30a of the third conductor wire 30 is hooked onto the first and second crossover wire guide portions 26b on the lower insulator 26, and then the third conductor wire 30 is wound into a left-handed winding for a predetermined number of winds on the electrically-insulating segments 24a and 26a surrounding the next tooth 21b but one (the third tooth 21b). This procedure is performed repeatedly such that the third conductor wire 30 is alternately wound into right-handed and left-handed windings on the electrically-insulating segments 24a and 26a surrounding every second tooth 21b (the first, third, fifth, and seventh teeth 21b). Then, after winding the third conductor wire 30 onto the electrically-insulating segments 24a and 26a surrounding the last (seventh) tooth 21b, the third conductor wire 30 is hooked onto the fifth winding hooking pin 28, then hooked onto the fifth winding slackening pin 17, and then wound onto the fifth terminal pin 27 ($S_2$). The first and second ends of the third conductor wire 30 (the winding start and the winding finish) are soldered to the first and fifth terminal pins 27 ($S_4$ and $S_2$) to obtain the second output winding 33. Here, the winding start end (a lead wire portion) of the third conductor wire 30 is disposed under tension between the first terminal pin 27 ($S_4$) and the first tooth 21b, and the winding finish end (a lead wire portion) of the third conductor wire 30 is disposed under tension between the fifth terminal pin 27 ($S_2$) and the seventh tooth 21b.

Moreover, an L in FIG. 9 indicates a left-handed winding, and an R a right-handed winding. Furthermore, the excitation winding 31 and the first output winding 32 have been omitted from FIG. 9 to facilitate explanation. The second output winding 33 is wound onto different teeth 21b (the first, third, fifth, and seventh teeth 21b) than the first output winding 32 (the eighth, second, fourth, and sixth teeth 21b).

Next, the sensor core 21 with each of the windings 31, 32, and 33 installed is removed from the winding jig 16 to obtain the sensor stator 12 shown in FIGS. 10A, 10B, and 10C. Thus, the winding slackening pins 17 are pulled out, releasing the state of tension in the first and second ends (the winding start end and the winding finish end) of the conductor wires 30. In other words, the lead wire portions of the conductor wires 30 are disposed so as to have a predetermined amount of slack. Since the portions of each of the conductor wires 30 engaging the winding slackening pins 17 deform plastically, the lead wire portions of the conductor wires 30 maintain the shapes they have before the removal of the winding slackening pins 17.

In addition, as shown in FIGS. 11A and 11B, the silicone rubber 34 is applied so as to embed the lead wire portions of the conductor wires 30.

Lastly, a sensor stator unit is obtained by mounting the upper protective cover 14 and the lower protective cover 15 to the sensor stator 12 assembled in this manner from above and below.

The rotation angle detector 10 constructed in this manner is mounted to a housing 41 of a motor 40 so as to be held by fastening screws 43 using the mounting apertures 21d of the flange portions 21c on the sensor core 21, as shown in FIGS. 12A and 12B. Here, because the mounting apertures 21d are formed as slots, fine adjustments can be made to the mounted angle of the rotation angle detector 10 as it is mounted. Furthermore, the sensor rotor 22 is rotatably mounted relative to the sensor core 21 by press-fitting the interfitting aperture 22a thereof onto a shaft 42 projecting from the housing 41. The rotation angle detector 10 is electrically connected to external circuits such as an excitation circuit, a detector circuit, etc., by means of the connector 13.

Now, when the shaft 42 of the motor 40 is driven to rotate, the sensor rotor 22 rotates with the shaft 42. Thus, the gap permeance between the sensor core 21 and the sensor rotor 22 changes sinusoidally with angle. When an excitation voltage $E_{R1 \cdot R2}$ (=E sin ($\omega$t)) is applied to the first and second ends ($R_1$ and $R_2$) of the excitation winding 31, a first output voltage $E_{S1 \cdot S3}$ (=K E sin ($\omega$t) cos (X $\theta$)) is output at the first and second ends ($S_1$ and $S_3$) of the first output winding 32, and a second output voltage $E_{S2 \cdot S4}$ (=K E sin ($\omega$t) sin (X$\theta$)) is output at the first and second ends ($S_2$ and $S_4$) of the second output winding 33. Moreover, K is a ratio of transformation, $\theta$ is a rotation angle, E is an input voltage, $\omega$=2nf, f is an excitation frequency, t is time (in seconds), and X is an axial double angle (in this case, 2).

These two phases of output voltage $E_{S1 \cdot S3}$ and $E_{S2 \cdot S4}$ are output to the external circuits and converted to detect the rotation angle.

According to Embodiment 1, the lead wire portions of each of the conductor wires 30 constituting the sensor coil 22 are disposed so as to have a predetermined amount of slack. Hence, because tensile stress acting on the lead wire portions of the conductor wires 30 as a result of differences in thermal expansion between the conductor wires 30 and the upper insulator 23 due to changes in the temperature in the environment around the rotation angle detector 10 is absorbed by the slack, wire breakages in the conductor wires 30 are reliably prevented even if the lead wire portions of the conductor wires 30 are connected directly to the terminal pins 27. Thus, reliability of the rotation angle detector 10 is increased, the working temperature range can be widened, and cost reductions can be achieved due to the elimination of connecting members such as the relay circuit board 8, etc.

Because the lead wire portions of each of the conductor wires 30 are constructed so as not to cross each other, even if the process of winding the sensor coil 22 is automated, a winding nozzle of a winding machine is prevented during installation of the second and third conductor wires 30 from catching on the lead wire portions of the conductor wires 30 already installed. Thus, automation of the process of winding the sensor coil 22 is made possible, and failures such as wire breakages in the conductor wires 30 can be eliminated.

Because the crossover wire guide portions 26b for guiding the crossover wire portions 30a of the conductor wires 30 spanning between the teeth 21b are formed on the lower insulator 26, even if the process of winding the sensor coil 22 is automated, interference between the lead wire portions of the conductor wires 30 and the winding nozzle or a crossover processing mechanism portion of the winding machine is eliminated, suppressing the occurrence of wire breakages in the conductor wires 30 in the winding process.

Because the connector 13 is formed integrally with the upper insulator 23, the number of parts is reduced and the construction is simplified, enabling cost reductions to be achieved.

Because the silicone rubber 34 is applied so as to embed the lead wire portions of the conductor wires 30, movement of the lead wire portions of the conductor wires 30 due to vibration or impact can be prevented even if the lead wire portions of the conductor wires 30 are provided with slack. Thus, wire breakage incidents in the conductor wires 30 resulting from movement of the lead wire portions of the conductor wires 30 are prevented. Because the silicone rubber 34 is elastic, the lead wire portions of the conductor wires 30 displace in response to tensile stress without being affected by the silicone rubber 34, enabling the tensile stress to be absorbed.

Next, the "slack" in the lead wire portions of the conductor wires 30 will be explained with reference to FIG. 13.

When the lead wire portion of a conductor wire 30 is disposed under tension by means of a winding hooking pin 28 between a terminal pin 27 and a tooth-wound portion 35 (the portion of the conductor wire 30 wound onto a tooth 21a), a length $l_0$ of the lead wire portion of the conductor wire 30 from the tooth-wound portion 35 to the terminal pin 27 is (a+b). If the temperature of the rotation angle detector 10 changes by T (° C.) in this state, the change in length $\Delta l$ of the lead wire portion of the conductor wire 30 from the terminal pin 27 to the tooth-wound portion 35 is given by the following expression:

$$\Delta l = (E_2 - E_1) T l_0$$

Moreover, $E_1$ (° C.$^{-1}$) is the coefficient of linear expansion of the base material (the copper wire) of the conductor wire 30, and $E_2$ (° C.$^{-1}$) is the coefficient of linear expansion of the upper insulator 23.

On the other hand, if the lead wire portion of the conductor wire 30 is disposed under tension by means of a winding slackening pin 17 and the winding hooking pin 28 between the terminal pin 27 and the tooth-wound portion 35, the length l of the lead wire portion of the conductor wire 30 from the tooth-wound portion 35 to the terminal pin 27 becomes (a+c+d). Thus, because the winding slackening pin 17 is removed after installing the conductor wire 30, the slack $\alpha$ in the lead wire portion becomes (c+d−b). This slack $\alpha$ can be adjusted by varying the disposed position of the winding slackening pin 17.

Now, if the slack $\alpha$ is set to less than the change in length $\Delta l$, the tensile stress acting on the lead wire portion of the conductor wire 30 as a result of differences in thermal expansion between the conductor wire 30 and the upper insulator 23 cannot be absorbed completely. Consequently, it is desirable for the slack $\alpha$ in the lead wire portion to be set so as to be equal to or greater than $\Delta l$.

Thus, the disposed position of the winding slackening pin 17 should be set by calculating $\Delta l$ from the working temperature range of the rotation angle detector 10 and providing the lead wire portion of the conductor wire 30 with an appropriate amount of slack $\alpha$ ($\geq \Delta l$).

Moreover, in Embodiment 1 above, the silicone rubber 34 is applied so as to embed the lead wire portions of the conductor wires 30, but the lead wire protective resin layer is not limited to the silicone rubber 34, and for example, a synthetic rubber such as an acrylic rubber, a urethane rubber, etc., may also be used. It is desirable for this lead wire protective resin layer to have a hardness equal to or less than 80 as prescribed by Japanese Industrial Standards JIS K6253 Type A (International Organization for Standardization ISO7619 TYPE A) to enable the lead wire portions of the conductor wires 30 to displace in response to tensile stress resulting from temperature changes.

Furthermore, in Embodiment 1 above, the tooth-wound portions of the conductor wires 30 may also be fixed by impregnation with a varnish after winding the conductor wires 30 onto the teeth 21b. Alternatively, the tooth-wound portions of the conductor wires 30 may also be fixed by using self-fusing wires coated with a thermoplastic resin or the like for the conductor wires and applying a heat treatment after winding.

In Embodiment 1 above, because the upper protective cover 14 and the lower protective cover 15 are mounted to the sensor stator 12 by snap-fitting, etc., the lead wire portions and the tooth-wound portions of the conductor wires 30 are not exposed, preventing the sensor coil 22 from being damaged during mounting to the motor, etc., or during transport and handling.

Furthermore, Embodiment 1 above has been explained for cases in which an upper protective cover 14 and a lower protective cover 15 are mounted, but the upper protective cover 14 and the lower protective cover 15 may also be omitted. When being applied to uses requiring strength, the entire sensor stator 12 may also be resin-molded or potted after installing the sensor coil 22.

In Embodiment 1 above, the lead wire portions of the conductor wires 30 are hooked onto the winding hooking pins 28 and connected to the terminal pins 27, but it goes without saying that the winding hooking pins 28 may also be omitted.

In Embodiment 1 above, the insulator for electrically insulating the sensor core 21 from the sensor coil 22 is constituted by two parts, namely the upper insulator 23 and the lower insulator 26, but the insulator may also be constituted by one integrally-molded body including the upper insulator 23 and the lower insulator 26 with the sensor core 21 insert-molded.

In Embodiment 1 above, the terminal pins 27 are mounted to the upper insulator 23 by press-fitting, but the terminal pins 27 may also be insert-molded into the upper insulator 23.

In Embodiment 1 above, the winding hooking pins 28 are formed integrally with the upper insulator 23, but the winding hooking pins 28 may also be made into separate parts and press-fitted or insert-molded into the upper insulator 23.

In Embodiment 1 above, a PBT resin is used as the material for the upper insulator 23, the lower insulator 26, the upper protective cover 14, the lower protective cover 15, etc., but the material for these parts is not limited to the PBT resin, and for example, a nylon, a polyphenylene sulfide (PPS), etc., can also be used.

The present invention is constructed in the above manner and exhibits the effects described below.

As explained above, according to one aspect of the present invention, there is provided a rotation angle detector including:

a sensor core in which a plurality of teeth are formed on an inner circumferential portion of an annular yoke;

a sensor coil composed of an excitation winding and an output winding each constructed by installing a conductor wire on the teeth;

an insulator mounted to the sensor core so as to electrically insulate the sensor core and the sensor coil;

a connector formed integrally with the insulator so as to be positioned on an outer circumferential side of the yoke; and a sensor rotor rotatably disposed inside the yoke, wherein lead wire portions of the conductor wires constituting the excitation winding and the output winding are each joined to a terminal pin of the connector on a first surface side of the insulator so as to have a predetermined amount of slack, whereby tensile force acting on the lead wire portions of the conductor wires as a result of changes in temperature in the working environment is absorbed by the slack in the lead wire portions, preventing wire breakages due to changes in the temperature in the working environment even if the lead wire portions are connected directly to the terminal pins. Thus, an inexpensive rotation angle detector is provided enabling the need for connecting parts such as relay circuit boards, etc., to be eliminated and the occurrence of wire breakages in the windings to be reliably suppressed.

The lead wire portions of the conductor wires may be disposed so as not to cross each other, preventing a winding nozzle of a winding machine from catching on the lead wire portions and breaking the wires, thereby enabling the winding process to be automated and yield to be improved.

The lead wire portions of the conductor wires may be covered by a lead wire protective resin layer, preventing the lead wire portions from moving due to vibration or impact.

A crossover wire guide portion for guiding a crossover wire portion of the conductor wires spanning between the teeth may be formed on a second surface side of the insulator, eliminating interference between the winding nozzle of the winding machine or a crossover treatment mechanism portion and the lead wire portions, thereby suppressing the occurrence of wire breakages in the winding process.

What is claimed is:

1. A method for manufacturing a rotation angle detector comprising:
    a sensor core in which a plurality of teeth are formed on an inner circumferential portion of an annular yoke;
    a sensor coil composed of an excitation winding and an output winding each constructed by installing a conductor wire on said teeth;
    an insulator mounted to said sensor core so as to electrically insulate said sensor core and said sensor coil;
    a connector formed integrally with said insulator so as to be positioned on an outer circumferential side of said yokes,
    a sensor rotor rotatably disposed inside said yoke,
    a plurality of terminal pins of said connector formed on a first surface side of said insulator; and
    a plurality of winding hooking pins formed so as to project from the first surface side of said insulator,
    wherein first and second lead wire portions corresponding to a winding start end and a winding finish end of each of said conductor wires wound on said teeth are each hooked on one of the winding hooking pins and joined to one of the terminal pins so as to have a predetermined amount of slack,
    said method comprising the steps of:
    mounting said insulator on said sensor core;
    disposing a plurality of winding slackening pins at predetermined positions between said teeth and said terminal pins so as to project outwardly on the first surface side of said insulator;
    winding said conductor wires so as to dispose said first lead wire portion of each of said conductor wires wound on said teeth under tension between said teeth and said terminal pin by hooking said first lead wire portion onto one of the winding hooking pins and one of the winding slackening pins corresponding to the wire start end thereof, and so as to dispose said second lead wire portion of each of said conductor wires wound on said teeth under tension between said teeth and said terminal pin by hooking said second lead wire portion onto another of the winding hooking pins and another of the winding slackening pins corresponding to the wire finish end thereof; and
    removing said wiring slackening pins so that said first and second lead wire portions have a predetermined amount of slack.

2. The method for manufacturing a rotation angle detector according to claim 1, wherein
    the step of winding said conductor wires comprising;
    winding said first lead wire portion of each conductor wires onto one of the terminal pins corresponding to the winding start end thereof,
    hooking said first lead wire portion onto one of the winding slackening pins corresponding to the winding start end thereof,
    hooking said first lead wire portion onto one of the winding hooking pins corresponding to the winding start end thereof,
    winding said conductor wire on said teeth,
    hooking said second lead wire portion of each of said conductor wires onto another of the winding hooking pins corresponding to the winding finish end thereof,
    hooking said second lead wire portion onto another of the terminal pins corresponding to the winding finish end.

3. The method for manufacturing a rotation angle detector according to claim 1, further comprising the step of covering said first and second lead wire portions of said conductor wires with a lead wire protective resin layer.

4. The method for manufacturing a rotation angle detector according to claim 1, wherein:
    said first and second lead wire portions of said conductor wires are disposed so as not to cross each other.

* * * * *